(12) United States Patent
Zhu (10) Patent No.: US 10,769,112 B2
(45) Date of Patent: Sep. 8, 2020

(54) DEDUPLICATION OF FILE

(71) Applicant: International Business Machines Corporation, Armonk, NY (US)

(72) Inventor: Guo Feng Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 14/724,859

(22) Filed: May 29, 2015

(65) Prior Publication Data

US 2015/0347445 A1 Dec. 3, 2015

(30) Foreign Application Priority Data

May 30, 2014 (CN) .......................... 2014 1 0239472

(51) Int. Cl.
*G06F 16/00* (2019.01)
*G06F 16/174* (2019.01)

(52) U.S. Cl.
CPC ................. *G06F 16/1752* (2019.01)

(58) Field of Classification Search
CPC ................. G06F 17/30159; G06F 16/1752
USPC .......................................................... 707/692
See application file for complete search history.

(56) References Cited

U.S. PATENT DOCUMENTS

| | | | | |
|---|---|---|---|---|
| 5,568,628 A * | 10/1996 | Satoh | ................... | G06F 12/0866 711/113 |
| 7,249,248 B2 * | 7/2007 | Vinnnakota | ......... | G06F 9/30101 712/241 |
| 7,979,403 B2 * | 7/2011 | Kedem | .................. | G06F 3/0608 707/693 |
| 8,234,468 B1 * | 7/2012 | Deshmukh | ........ | G06F 17/30156 711/162 |
| 8,315,985 B1 * | 11/2012 | Ohr | ..................... | G06F 11/1453 707/664 |
| 8,364,652 B2 * | 1/2013 | Vijayan | ............. | G06F 17/30156 707/692 |
| 8,484,356 B1 * | 7/2013 | Douglis | .............. | G06F 11/1453 709/214 |
| 8,650,162 B1 * | 2/2014 | Vaikar | ................. | G06F 11/1451 707/692 |

(Continued)

FOREIGN PATENT DOCUMENTS

| CN | 102082575 A | 6/2011 |
|---|---|---|
| CN | 102479245 A | 5/2012 |

(Continued)

OTHER PUBLICATIONS

Bobbarjung, et al.; "Improving Duplicate Elimination in Storage Systems"; ACM Transactions on Storage; vol. 2; No. 4; Nov. 2006; pp. 424-448.

(Continued)

*Primary Examiner* — Mark E Hershley
(74) *Attorney, Agent, or Firm* — Edward J. Wixted, III (57) ABSTRACT

The present invention discloses a method for deduplication of a file, a computer program product, and an apparatus thereof. In the method, the file is partitioned into at least one composite block, wherein the composite block includes a fixed-size block and a variable-size block, the variable-size block being determined based on content of the file. Then a deduplication operation is performed on the at least one composite block.

20 Claims, 6 Drawing Sheets

(56) References Cited

U.S. PATENT DOCUMENTS

| | | | | |
|---|---|---|---|---|
| 8,849,768 | B1* | 9/2014 | Agrawal | G06F 17/30147 707/664 |
| 8,909,605 | B1* | 12/2014 | Li | G06F 11/1464 707/674 |
| 8,924,366 | B2* | 12/2014 | Bromley | G06F 17/30156 707/692 |
| 9,465,808 | B1* | 10/2016 | Karr | G06F 17/30156 |
| 9,635,132 | B1* | 4/2017 | Lin | H04L 67/32 |
| 2002/0118307 | A1* | 8/2002 | Lee | G06F 12/023 348/714 |
| 2006/0129901 | A1* | 6/2006 | Arataki | G06F 11/1064 714/752 |
| 2008/0133446 | A1* | 6/2008 | Dubnicki | G06F 17/30159 |
| 2008/0133561 | A1* | 6/2008 | Dubnicki | G06F 11/1453 |
| 2008/0159331 | A1* | 7/2008 | Mace | H04L 47/10 370/473 |
| 2010/0064166 | A1* | 3/2010 | Dubnicki | G06F 17/30067 714/4.1 |
| 2010/0287438 | A1* | 11/2010 | Lakkis | H03M 13/112 714/752 |
| 2011/0099351 | A1* | 4/2011 | Condict | G06F 3/0608 711/216 |
| 2011/0225385 | A1* | 9/2011 | Tofano | G06F 17/30156 711/170 |
| 2011/0246741 | A1* | 10/2011 | Raymond | G06F 17/30159 711/170 |
| 2012/0173656 | A1* | 7/2012 | Sorenson, III | G06F 17/30156 709/217 |
| 2012/0290546 | A1* | 11/2012 | Smith | G06F 3/0608 707/700 |
| 2013/0046733 | A1* | 2/2013 | Sakuraba | G06F 11/1453 707/640 |
| 2013/0138607 | A1* | 5/2013 | Bashyam | G06F 17/30174 707/610 |
| 2013/0198854 | A1* | 8/2013 | Erway | H04L 9/008 726/27 |
| 2013/0238570 | A1* | 9/2013 | Rao | G06F 17/30156 707/692 |
| 2013/0268497 | A1* | 10/2013 | Baldwin | G06F 17/30159 707/692 |
| 2013/0290278 | A1* | 10/2013 | Aronovich | G06F 7/00 707/692 |
| 2013/0325821 | A1* | 12/2013 | Amit | G06F 17/30159 707/692 |
| 2014/0025644 | A1* | 1/2014 | Taylor | G06F 17/30129 707/690 |
| 2014/0032508 | A1* | 1/2014 | Rao | G06F 3/0641 707/692 |
| 2014/0114934 | A1* | 4/2014 | Chakraborty | G06F 3/0608 707/692 |
| 2014/0181054 | A1* | 6/2014 | Starr | G06F 17/30159 707/692 |
| 2014/0229452 | A1* | 8/2014 | Serita | G06F 16/1748 707/692 |
| 2015/0019833 | A1* | 1/2015 | Aronovich | G06F 12/023 711/171 |
| 2015/0134623 | A1* | 5/2015 | Liu | G06F 11/1453 707/692 |
| 2015/0142755 | A1* | 5/2015 | Kishi | G06F 12/04 707/692 |
| 2015/0234710 | A1* | 8/2015 | Berrington | G06F 11/1407 707/664 |
| 2015/0347445 | A1* | 12/2015 | Zhu | G06F 16/1752 707/692 |

FOREIGN PATENT DOCUMENTS

| | | |
|---|---|---|
| CN | 102682086 A | 9/2012 |
| CN | 103324699 A | 9/2013 |

OTHER PUBLICATIONS

Bolosky, et al.; "Single Instance Storage in Windows 2000", pp. 1-12.

Denehy, et al.; "Duplicate Management for Reference Data"; IBM Research Report; Oct. 7, 2003; pp. 1-15.

Eshghi, et al.; "A Framework for Analyzing and Improving Content-Based Chunking Algorithms"; Hewlett-Packard Development Company, L.P; © 2005; Sep. 22, 2005; pp. 1-11.

Kubiatowicz, et al; "OceanStore: An Architecture for Global-Scale Persistent Storage"; © 2000; pp. 1-12.

Li, et al.; "Data Deduplication Techniques"; Institute of Software, the Chinese Academy of Sciences; Journal of Software; vol. 21; No. 5; May 2010; ISSN1000-9825, CODEN RUXUEW, pp. 916-929.

Lkhagvasuren, et al.; "Byte-index Chunking Algorithm for Data Deduplication System"; ISSN: 1738-9976 IJSIA; © 2013 SERSC; pp. 415-424.

Quinlan, et al.; "Venti: a new approach to archival storage"; pp. 1-13.

Yang, et al.; "DEBAR: A Scalable High-Performance Deduplication Storage System for Backup and Archiving"; University of Nebraska; Department of Computer Science and Engineering; CSE Technical reports; Jan. 5, 2009, pp. 1-20.

Eshghi et al., "A Framework for Analyzing and Improving Content-Based Chunking Algorithms", Feb. 2005, 11 pages, © 2005 Hewlett-Packard Development Company, L.P.

\* cited by examiner

DEDUPLICATION OF FILE

BACKGROUND

The present invention relates to deduplication techniques, and more specifically, to a method for deduplication of a file and an apparatus thereof.

Deduplication is a widely used data reduction technique in the process of backing up and archiving data, which eliminates redundant data by deleting duplicate data in data sets (for example, a file), so as to reduce a storage capacity used in the storage space.

Typically, the redundant data can be divided into three types: File Level, Block Level and Byte Level. In the type of File Level, the redundant data is entire files, which means one file is a duplicate of at least one other file. In the type of Block Level, the redundant data is blocks within the file, which means there are identical data blocks among different files. In the type of Byte Level, the redundant data is more fine-grained data in bytes.

There are some deduplication methods for these three types of redundant data. Single Instance Storage is a deduplication technique for the File Level, which can effectively detect duplicate files. When each file is stored onto a content addressable memory (CAS) device, the CAS device will generate a hash for the file content stored therein. If there are already files having an identical hash in the CAS device, the CAS device will recreate a pointer representing a duplicate to point to the already existing files, without saving the duplicate files. The deduplication technique for the Byte Level may effectively eliminate the redundant bytes by data compression technology.

A commonly used deduplication method is a hash-based method. In this method, firstly, the data file is segmented into a set of data blocks, and for each data block, a fingerprint (i.e. a hash value) is calculated. Then the fingerprint is used as a keyword for hash retrieving. If matching, it indicates that the data block is a duplicate data block, and only an index number of the data block is stored. If not matching, it indicates that the data block is a new data block, and the data block will be stored and the associated metadata will be created.

There are three kinds of chunking methods, namely, fixed-size partition (FSP), content-defined chunking (CDC) and sliding-window blocking (SB). The FSP method is to partition a file into data blocks with a fixed length, so as to quickly detect the redundant data. The CDC method and the SB method are to partition a file into data blocks with a variable size based on content of the file, so as to effectively find the redundant data.

However, when the deduplication is performed on a file, if the file has deduplication executed previously and is modified later, for example, new data is inserted into the file, or the original data is deleted from the file, or the data is modified in the file, which changes the length of the file, the FSP method is very sensitive to such modification, and is very inefficient. This is because the FSP method partitions the file into the fixed-size blocks. One or some data blocks obtained by partitioning the modified file will contain the modified data. Compared with the data blocks obtained by partitioning the file before the modification, the contents of the data blocks change and they become the new data blocks. Since the length of the data block is fixed, the contents in the subsequent data blocks also change due to the change in the length of the file, and these data blocks also become the new data blocks. In this way, the redundant data blocks in the file will not be actually detected, so the deduplication rate for the file is reduced.

Although the CDC method and the SB method can solve such a problem, it is relatively difficult to determine the size of the data blocks, which renders the deduplication speed lower than that of the FSP method.

SUMMARY

Embodiments of the present invention provide a method for deduplication of a file, computer program product, and an apparatus thereof.

According to one embodiment of the present invention, there is provided a method for deduplication of a file, which comprises: partitioning the file into at least one composite block, wherein the composite block includes a fixed-size block and a variable-size block, the variable-size block being determined based on content of the file; and performing a deduplication operation on the at least one composite block.

According to another embodiment of the present invention, there is provided an apparatus for deduplication of a file, which comprises: a partitioning module configured to partition the file into at least one composite block, wherein the composite block includes a fixed-size block and a variable-size block, the variable-size block being determined based on content of the file; and a deduplication module configured to perform a deduplication operation on the at least one composite block.

DETAILED DESCRIPTION

The embodiments of the present invention can execute the deduplication for the Block Level quickly and efficiently, utilize fixed-size blocks to accelerate the speed of deduplication, and utilize variable-size blocks to eliminate the influence caused by the change of the content of the file effectively.

Some preferable embodiments will be described in more detail with reference to the accompanying drawings, in which the preferable embodiments of the present invention have been illustrated. However, the present invention can be implemented in various manners, and thus should not be construed to be limited to the embodiments disclosed herein. On the contrary, these embodiments are provided for the thorough and complete understanding of the present invention, and to completely convey the scope of the present invention to those skilled in the art.

Figure 1:
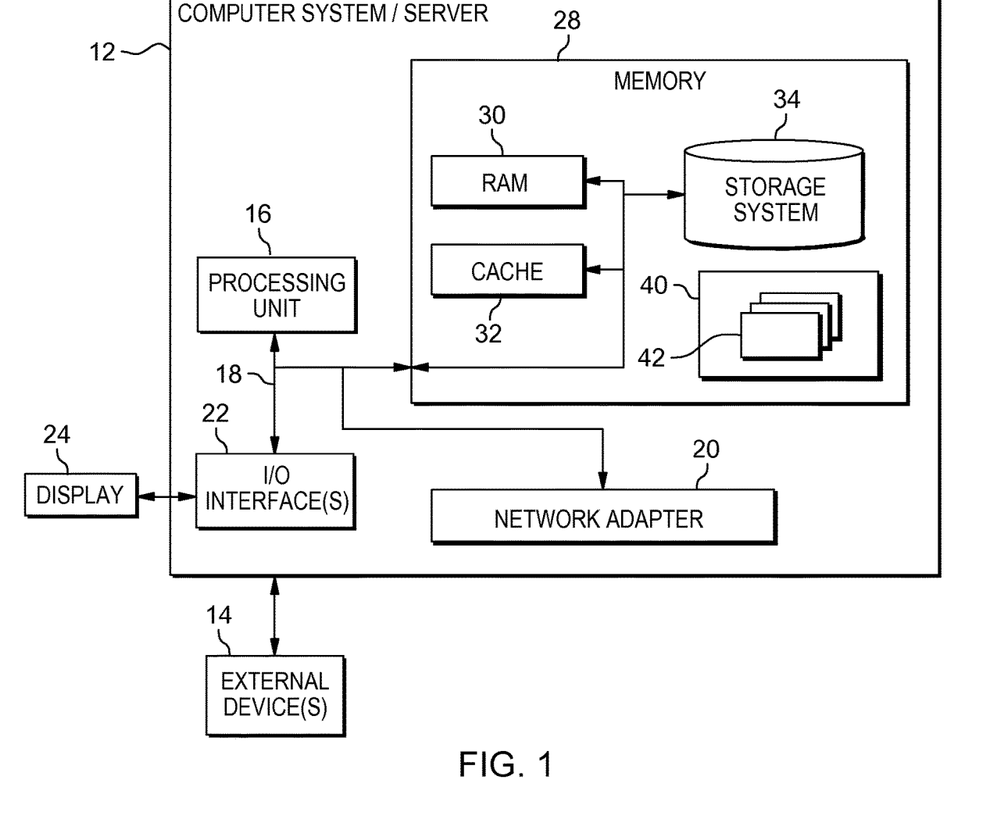
FIG. 1 shows a block diagram of an exemplary computer system/server 12 which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to the one or more processors or processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules 42 that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, one or more other devices that enable a user to interact with computer system/server 12, any devices (e.g., network card, modem, etc.) that enable computer system/server 12 to communicate with one or more other computing devices, etc. Such communication can occur via Input/Output (I/O) interfaces 22. Computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, data archival storage systems, etc.

Figure 2:
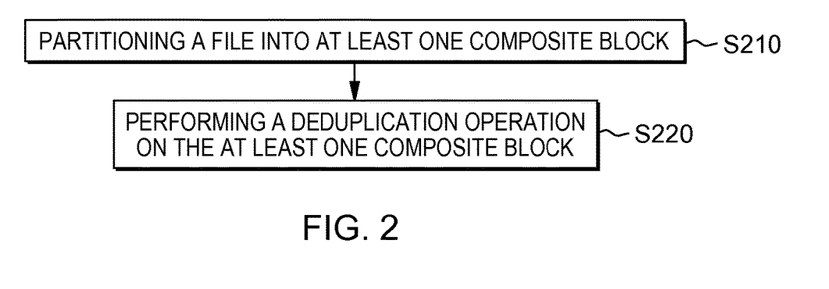
FIG. 2 is a flowchart of the method for deduplication of a file according to an embodiment of the present invention.

With reference now to FIG. 2, FIG. 2 shows a flowchart of the method for deduplication of a file according to an embodiment of the present invention. This embodiment will be described below in detail in conjunction with the accompanying Figure.

As shown in FIG. 2, in S210, the file is partitioned into at least one composite block, wherein the composite block includes a fixed-size block and a variable-size block. In the present embodiment, the fixed-size block is a data block with a fixed length, and the variable-size block is a data block with a variable length. Thus, the partitioned composite blocks may have the same size or different sizes. In addition, the variable-size block is determined based on content of the file.

Different from other approaches where the file is partitioned into either only fixed-size blocks or variable-size blocks, in the present embodiment, the file is partitioned into the at least one composite block, wherein each composite block includes a fixed-size block and variable-size block, which thereby can increase the deduplication speed, without reducing the deduplication rate.

Figure 3:
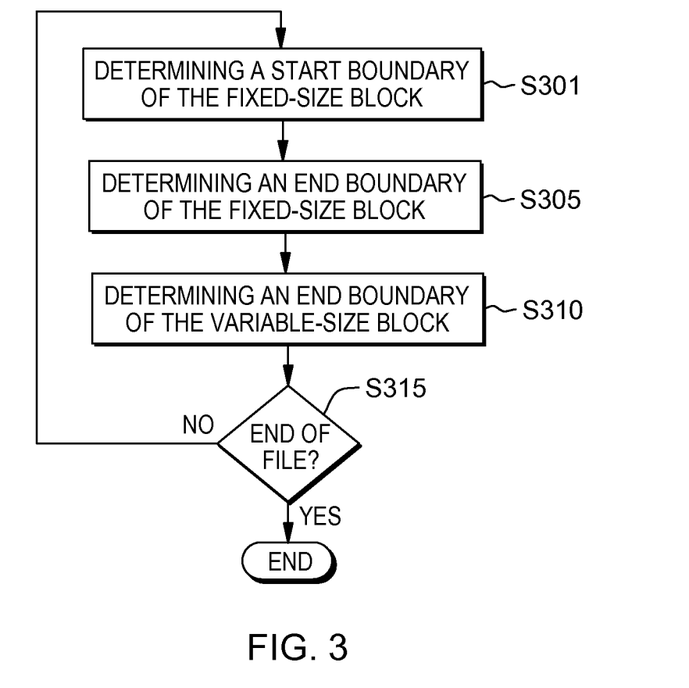
FIG. 3 is a schematic flowchart of the process for partitioning a file into at least one composite block in the embodiment shown in FIG. 2.

FIG. 3 shows a schematic flow diagram of the process for partitioning a file into at least one composite block (see FIG. 2, S210). As shown in FIG. 3, in S301, firstly, a start boundary of a fixed-size block is determined. When the file is read in, starting from a head of the file, the beginning of the file is determined as the start boundary of the fixed-size block. Next, in S305, an end boundary of the fixed-size block is determined, so that the length of the fixed-size block is equal to a first fixed length. The first fixed length may be any predetermined length. In one example, the first fixed length may be set as 8 kilobytes (kb). Once the start boundary and the end boundary of the fixed-size block are determined, the fixed-size block can be determined.

Next, in S310, the determined end boundary of the fixed-size block is considered as a start boundary of a variable-size block, and an end boundary of the variable-size block is determined based on content of the file. The determination of the end boundary of the variable-size block will be described later. After the start boundary and the end boundary of the variable-size block have been determined, the variable-size block can be determined. The fixed-size block and the variable-size block will constitute a composite block.

Then, in S315, it is determined whether an end of the file has been reached. If the end of the file has not been reached yet, the process returns to S301, in which the start boundary of another fixed-size block is determined. In this case, the end boundary of the variable-size block in the previous composite block can be determined as a start boundary of the next fixed-size block. Then the process goes to S305 to determine the end boundary of the next fixed-size block. If the end of the file has been reached, the process of partitioning the file ends.

Figure 4:
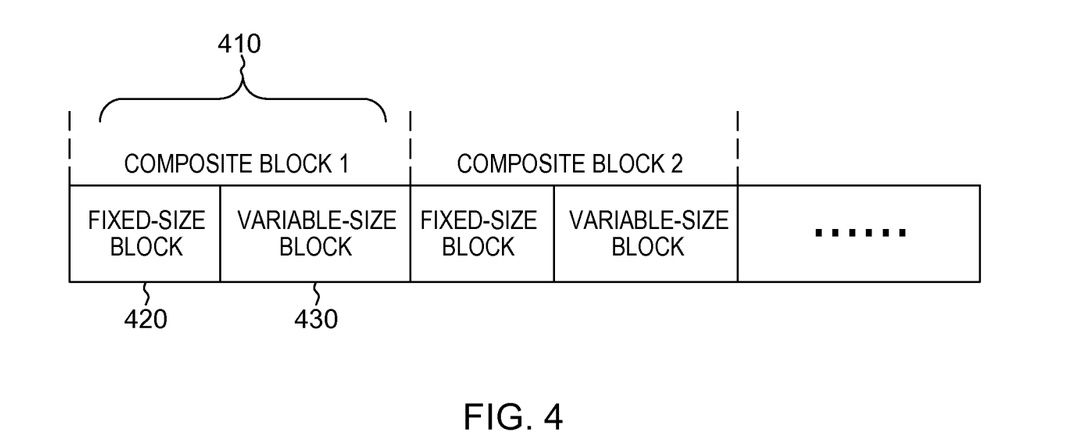
FIG. 4 is a schematic diagram illustrating the composite block of an embodiment of the present invention.

Using the process of partitioning the file as shown in FIG. 3, the file can be partitioned into at least one composite block (e.g., composite block 1 410), which includes a fixed-size block with a fixed length (e.g., fixed-size block 420) and a variable-size block with a variable length (e.g., variable-size block 430), as shown in FIG. 4. As the length of the fixed-size block in the composite block is always fixed, the deduplication speed can be accelerated. Also as the variable-size block is determined based on the content of the file, an offset of content caused by the modification of the file can be buffered. In other words, even if the file has deduplication executed previously and later is modified, after the modified file is partitioned with the process as shown in FIG. 3, there is only one composite block which is different from the corresponding composite block obtained by partitioning the file before modification, and other composite blocks will not be affected.

For example, if the content within some fixed-size block obtained by partitioning the modified file changes due to the modification of the file, for example, new data is added or original data is removed, then the offset of content caused by such change may be eliminated by the variable-size block in the same composite block. Because the length of the fixed-size block remains unchanged, the length of the variable-size block is changed. If new data is added to the fixed-size block, the length of the variable-size block will be increased. If original data is removed in the fixed-size block, the length of the variable-size block will be shortened. Therefore, in this case, only the fixed-size block and the variable-size block in the same composite block will be influenced, the composite block becomes a new composite block, and other subsequent composite blocks are not influenced. The redundant composite blocks can still be detected, so as not to reduce the deduplication ratio.

For another example, if the content within some variable-size block after partitioning is changed due to the modification of the file, then as the variable-size block is obtained based on the content of the file and the length of the variable-size block can be changed, and the offset of content caused by such change may be included in the variable-size block. Therefore, only the variable-size block is influenced and becomes a new variable-size block, the fixed-size block in the same composite block and other subsequent composite block remain unchanged. So the redundant composite blocks can still be detected, so as to ensure the deduplication ratio.

The process of determining the end boundary of the variable-size block (see S305) will be described in detail through several embodiments.

Figure 5:
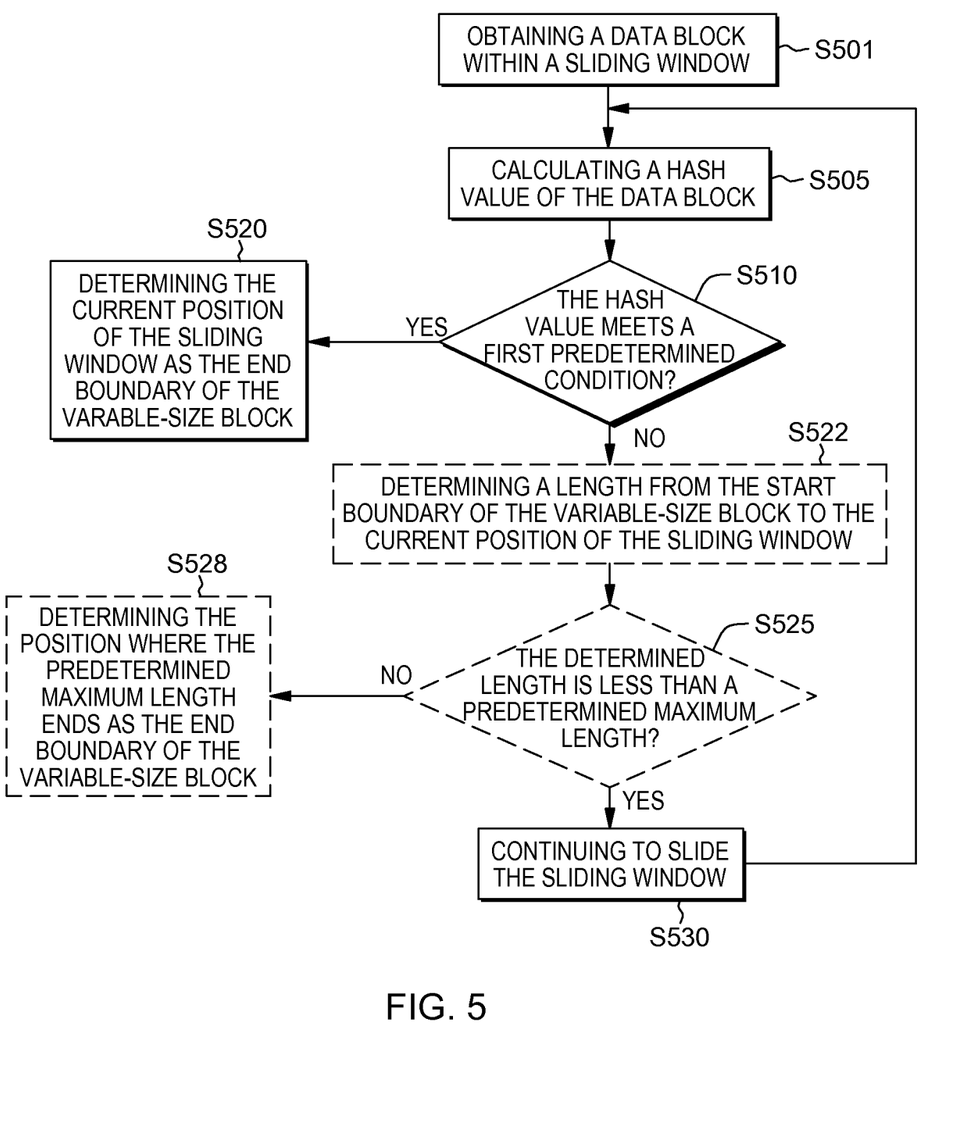
FIG. 5 is a schematic flowchart of an embodiment of the process for determining the end boundary of the variable-size block in the embodiment shown in FIG. 3.

FIG. 5 shows a schematic flowchart of an embodiment of the process for determining an end boundary of a variable-size block. As shown in FIG. 5, in S501, starting from the end boundary of the determined fixed-size block, a sliding window having a second fixed length slides on the file, to obtain a data block within the sliding window. The second fixed length may be any predetermined length. In one example, the second fixed length may be set as 48 bytes.

Next, in S505, a hash value of the data block within the sliding window is calculated to detect the end boundary of the variable-size block. A hash algorithm for calculating a weak hash value, such as RabinHash algorithm, may be used.

Then, in S510, it is determined whether the calculated hash value of the data block meets a first predetermined condition. In the present embodiment, the first predetermined condition is a block boundary condition, which may be defined as, for example, that a hash value of a data block modulo a predetermined integer is equal to a predetermined value, wherein the predetermined value is less than the predetermined integer. The predetermined integer and the predetermined value can be set arbitrarily. Typically, the predetermined value may be set as the predetermined integer minus one. The predetermined integer may be set as a desired average length of the variable-size block. For example, the first predetermined condition may be presented as:

$$H \% M = R$$

where H denotes the hash value of the data block, M denotes the predetermined integer, and R denotes the predetermined value which equals to M−1.

If the hash value of the data block meets the first predetermined condition, in S520, the current position of the sliding window is determined as the end boundary of the current variable-size block. Here, the position of the right-side boundary of the sliding window is regarded as the position of the sliding window. The right side indicates a side closer to the end of the file. If the hash value of the data block does not meet the first predetermined condition, in S530, the sliding window slides continuously on the file, to obtain the next data block. The sliding window may slide continuously, so that there is an interval of a predetermined length between the position of the sliding window after sliding and the previous position, wherein the predetermined length is less than or equal to a second fixed length. Thus, the obtained new data block is adjacent to or partially overlaps with the previous data block.

Then, returning to S505, a hash value is calculated for the obtained next data block. The above actions S505 to S530 are repeatedly executed, until the end boundary of the current variable-size block is determined.

However, in this embodiment, an issue that the variable-size block is too large may occur. To solve this issue, further, a maximum length for the variable-size block can be predetermined. In this case, if the determination result of S510 is that the hash value of the data block does not meet the first predetermined condition, prior to S530, in S522, a length from the start boundary of the current variable-size block to the current position of the sliding window is determined, i.e. the size of the data over which the sliding window has slid from the start boundary of the variable-size block. Then, in S525, it is determined whether the determined length is less than the predetermined maximum length for the variable-size block. If the determined length is less than the predetermined maximum length for the variable-size block, S520 is executed to continue to slide the sliding window to obtain the next data block. If the determined length is greater than or equal to the predetermined maximum length for the variable-size block, in S528, the position where the predetermined maximum length ends is determined as the end boundary of the current variable-size block.

Figure 6:
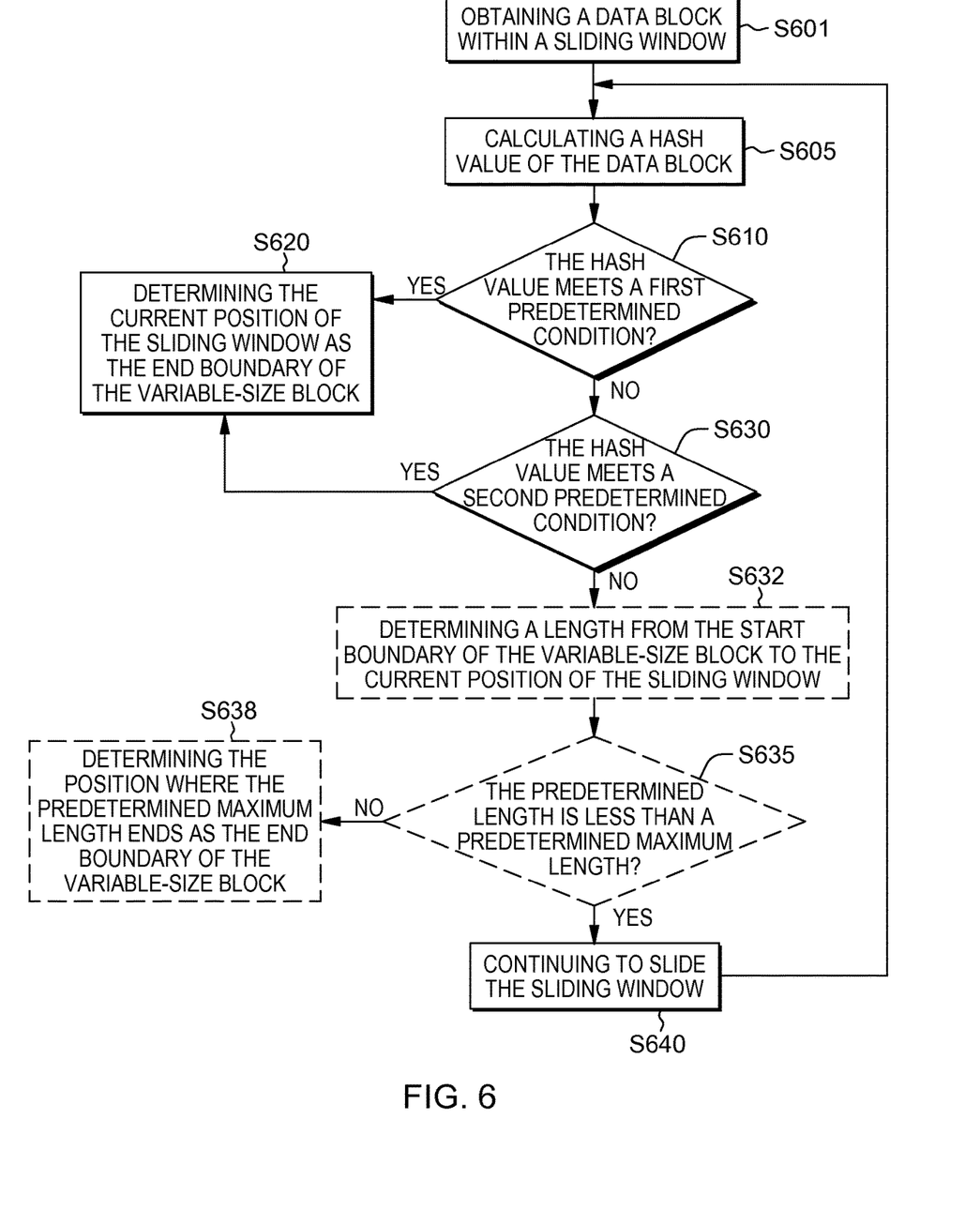
FIG. 6 is a schematic flowchart of another embodiment of the process for determining the end boundary of the variable-size block in the embodiment shown in FIG. 3.

FIG. 6 shows a schematic flowchart of another embodiment of the process for determining an end boundary of a variable-size block. In this embodiment, the actions S601, S605, S610 and S620 are the same as actions S501, S505, S510 and S520 in the embodiment shown in FIG. 5, whose description is properly omitted.

If the hash value of the data block does not meet the first predetermined condition in S610, in S630, it is determined whether the hash value of the data block meets a second predetermined condition. In the present embodiment, the second predetermined condition is a block boundary condition which is more fine-grained than the first predetermined condition, and the definition thereof is the same as that of the first predetermined condition. In the second predetermined condition, the predetermined integer is any integer smaller than the predetermined integer used in the first predetermined condition. For example, the predetermined integer in the second predetermined condition may be set as half of the predetermined integer in the first predetermined condition. Thus, the second predetermined condition may be presented as:

$$H\%M'=R'$$

where H denotes the hash value of the data block, M' denotes the predetermined integer, and R' denotes the predetermined value which equals to M'−1.

If the hash value of the data block meets the second predetermined condition in S630, S620 is executed, and the current position of the sliding window is determined as the end boundary of the current variable-size block. If the hash value of the data block does not meet the second predetermined condition in S630, in S640, the sliding window slides continuously on the file to obtain the next data block. Then, return to S605 to calculate a hash value of the next data block.

In the present embodiment, by setting the first predetermined condition and the second predetermined condition, the size of the variable-size block can be adjusted in a more fine-grained manner.

Further, the maximum length for the variable-size block can also be predetermined to prevent the variable-size block being too large. In this case, if the hash value of the data block does not meet the second predetermined condition in S630, prior to S640, in S632, a length from the start boundary of the current variable-size block to the current position of the sliding window is determined, i.e. the size of the data over which the sliding window has slid from the start boundary of the current variable-size block. Then, in S635, it is determined whether the determined length is less than the predetermined maximum length for the variable-size block. If the determined length is less than the predetermined maximum length for the variable-size block, S640 is executed to continue to slide the sliding window on the file to obtain the next data block. Then the process returns to S605 to calculate the hash value of the next data block. If the determined length is greater than or equal to the predetermined maximum length for the variable-size block, in S638, the position where the predetermined maximum length ends is determined as the end boundary of the current variable-size block.

Figure 7:
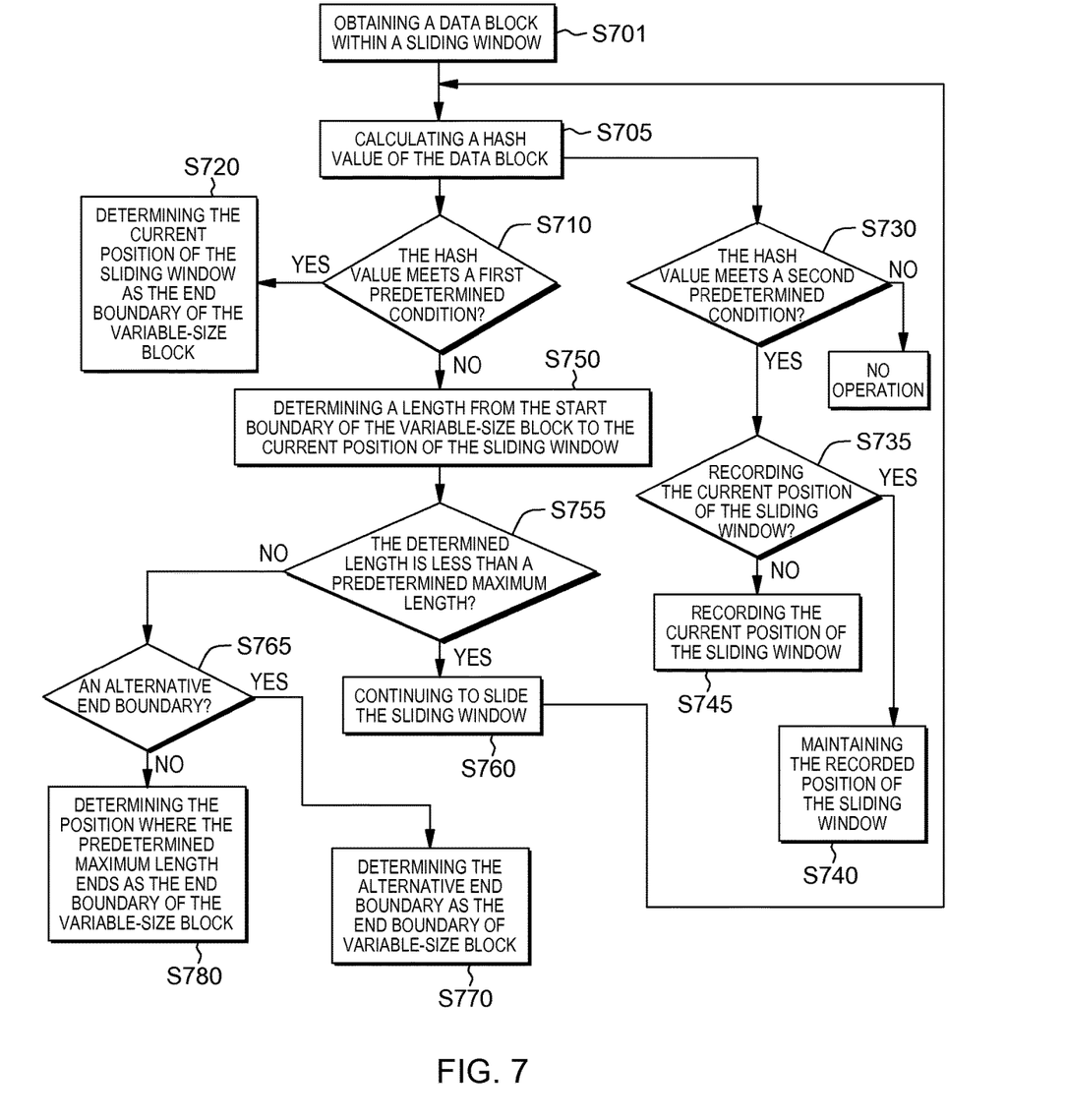
FIG. 7 is a schematic flowchart of a further embodiment of the process for determining the end boundary of the variable-size block in the embodiment shown in FIG. 3.

FIG. 7 shows a schematic flowchart of a further embodiment of the process for determining an end boundary of a variable-size block. In this embodiment, the actions S701, S705, S710 and S720 are the same as actions S501, S505, S510 and S520 in the embodiment shown in FIG. 5, whose description is properly omitted. Furthermore, the maximum length for the variable-size block is predetermined.

After the hash value of the data block has been calculated in S705, in parallel with S710, in S730, it is determined whether the hash value of the data block meets the second predetermined condition. In the present embodiment, the definition and setting of the second predetermined condition are the same as those of the second predetermined condition in the embodiment shown in FIG. 6.

If the hash value of the data block does not meet the second predetermined condition in S730, no operation is executed. If the hash value of the data block meets the second predetermined condition in S730, in S735, it is checked whether the position of the sliding window has been recorded previously for the current variable-size block, that is, whether the second predetermined condition is met for the first time for the current variable-size block. If it is checked that the position of the sliding window has been recorded previously, that is, the second predetermined condition is not met for the first time, in S740, the current position of the sliding window is not recorded, and the already recorded position of the sliding window is maintained. If it is checked that the position of the sliding window is not recorded previously, that is, the second predetermined condition is met for the first time, in S745, the current position of the sliding window is recorded as an alternative end boundary for the current variable-size block.

If the hash value of the data block does not meet the first predetermined condition in S710, in S750, a length from the start boundary of the current variable-size block to the current position of the sliding window is determined. Then, in S755, it is determined whether the determined length is less than the predetermined maximum length for the variable-size block. If the determined length is less than the predetermined maximum length for the variable-size block, in S760, the sliding window slides continuously on the file to obtain the next data block. Then the process returns to S705 to calculate the hash value of the next data block. If the determined length is greater than or equal to the predetermined maximum length for the variable-size block, in S765, it is checked whether there is an alternative end boundary for the variable-size block. If it is checked in S765 that there is the alternative end boundary for the variable-size block, in S770, the alternative end boundary is determined as the end boundary of the current variable-size block. If it is checked that there is no alternative end boundary for the variable-size block, in S780, the position where the predetermined maximum length ends is determined as the end boundary of the current variable-size block.

Returning to FIG. 2, after the file is partitioned into at least one packet data block, in S220, a deduplication operation is performed on the at least one composite block.

In S220, firstly, for each of the at least one composite block, the hash value of the fixed-size block and the hash value of the variable-size block are respectively calculated. Here, a hash algorithm such as MD5 and SHA-1 may be used for calculation to obtain the hash value that can uniquely identify the fixed-size block and the hash value that can uniquely identify the variable-size block.

Next, the hash value of the fixed-size block and the hash value of the variable-size block calculated are looked up in a hash table. The hash table can be used to store the hash values of data blocks and some metadata of data blocks, such as offset, reference and the like.

If the hash value of the fixed-size block is found in the hash table, which indicates that the fixed-size block is the duplicate data block, the fixed-size block is discarded. If the hash value of the fixed-size block is not found in the hash table, which indicates that the fixed-size block is the new data block, the fixed-size block is stored, and the hash value of the fixed-size block is stored in the hash table.

Similarly, if the hash value of the variable-size block is found in the hash table, which indicates that the variable-size block is the duplicate data block, the variable-size block is discarded. If the hash value of the variable-size block is not found in the hash table, which indicates that the variable-size block is the new block, the variable-size block is stored, and the hash value of the variable-size block is stored in the hash table.

It can be seen from the above description that the method for deduplication of a file of this embodiment can not only accelerate the deduplication speed, but also ensure the high deduplication rate by partitioning the file into the composite blocks including the fixed-size block and the variable-size block.

Although the above embodiments describe partitioning the file firstly to obtain all the composite blocks and then performing the deduplication operation on the respective composite blocks, those skilled in the art can appreciate that the deduplication operation can be performed on a fixed-size block or a variable-size block whenever the fixed-size block or the variable-size block is obtained by partitioning the file.

Figure 8:
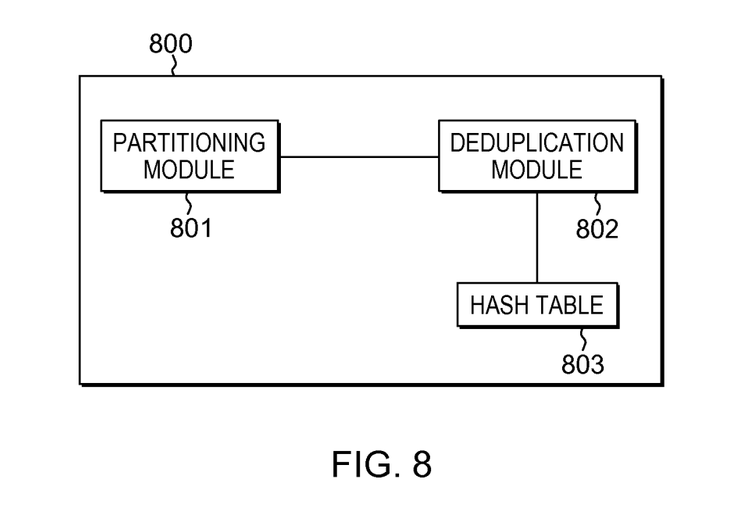
FIG. 8 is a schematic block diagram of the apparatus for deduplication of a file according to an embodiment of the present invention.

Under the same inventive concept, FIG. 8 shows a schematic block diagram of the apparatus 800 for deduplication of a file according to an embodiment of the present invention. The embodiment will be described in detail below in connection with the accompanying drawings, wherein the description of the parts same as those of the previous embodiments is omitted properly.

As shown in FIG. 8, the apparatus 800 of the present embodiment may comprise: a partitioning module 801, which is configured to partition the file into at least one composite block, wherein the composite block includes a fixed-size block and a variable-size block, the variable-size block being determined based on content of the file; and a deduplication module 802, which is configured to perform a deduplication operation on the at least one composite block.

In one embodiment, in the partitioning module 801, a fixed-size block determination module firstly determines a start boundary of a fixed-size block. When the file is read in, the fixed-size block determination module determines the beginning of the file as the start boundary of the fixed-size block. Then, the fixed-size block determination module determines an end boundary of the fixed-size block, so that a length of the fixed-size block is equal to a first fixed length. The first fixed length may be any predetermined length. Next, a variable-size block determination module determines an end boundary of the variable-size block based on the content of the file, with the end boundary of the determined fixed-size block as a start boundary of the variable-size block. The fixed-size block and the variable-size block will constitute a composite block. If the end of the file has not been reached, the fixed-size block determination module determines the start boundary of the next fixed-size block. At that time, the fixed-size block determination module determines the end boundary of the variable-size block in the previous composite block as a start boundary of the next fixed-size block, and determines the end boundary of the next fixed-size block. The fixed-size block determination module and the variable-size block determination module work alternatively until the end of the file.

In one embodiment, in the variable-size block determination module, a data block obtaining unit obtains a data block within a sliding window having a second fixed length starting from the end boundary of the fixed-size block. The second fixed length may be any predetermined length. Next, a calculation unit calculates a hash value of the obtained data block. Here, a hash algorithm for calculating a weak hash value such as RabinHash algorithm may be used. Then, a boundary determination unit determines the current position of the sliding window as the end boundary of the variable-size block, if the calculated hash value of the data block meets the first predetermined condition. In the present embodiment, the first predetermined condition is a block boundary condition, which may be defined as, for example, that a hash value of a data block modulo a predetermined integer is equal to the predetermined value. If the calculated hash value of the data block does not meet the first predetermined condition, the data block obtaining unit obtains the next data block by continuing to slide the sliding window on the file.

In another embodiment, in the variable-size block determination module, if the calculated hash value of the data block does not meet the first predetermined condition, a length determination unit determines a length from the start boundary of the current variable-size block to the current position of the sliding window. Then, if the determined length is less than a predetermined maximum length for the variable-size block, the data block obtaining unit obtains the next data block by continuing to slide the sliding window. If the determined length is greater than or equal to the predetermined maximum length for the variable-size block, the boundary determination unit determines the position where the predetermined maximum length ends as the end boundary of the current variable-size block.

In another embodiment, in the variable-size block determination module, if the calculated hash value of the data block does not meet the first predetermined condition but meets a second predetermined condition, the boundary determination unit determines the current position of the sliding window as the end boundary of the current variable-size block. In the present embodiment, the second predetermined condition is a block boundary condition which is more fine-grained than the first predetermined condition, and the definition thereof is same as that of the first predetermined condition. If the calculated hash value of the data block does not meet the first and the second predetermined conditions, the data block obtaining unit obtains the next data block by continuing to slide the sliding window on the file.

In another embodiment, in the variable-size block determination module, if the calculated hash value of the data block does not meet the first and second predetermined conditions, the length determination unit determines a length from the start boundary of the current variable-size block to the current position of the sliding window. If the determined length is less than the predetermined maximum length for the variable-size block, the data block obtaining unit obtains the next data block by continuing to slide the sliding window on the file. If the determined length is greater than or equal to the predetermined maximum length for the variable-size block, the boundary determination unit determines the position where the predetermined maximum length ends as the end boundary of the current variable-size block.

In another embodiment, in the variable-size block determination module, a checking unit checks whether the position of the sliding window has been recorded previously for the current variable-size block, if the calculated hash value of the data block meets the second predetermined condition. Then if it is checked that the position of the sliding window has been recorded previously, a recording unit does not record the current position of the sliding window, but maintains the recorded position of the sliding window. The recording unit also records the current position of the sliding window as an alternative end boundary for the variable-size block, if it is checked that the position of the sliding window has not been recorded previously. In parallel, the length determination unit determines a length from the start boundary of the current variable-size block to the current position of the sliding window, if the calculated hash value of the data block does not meet the first predetermined condition. Then, if the determined length is less than the predetermined maximum length for the variable-size block, the data block obtaining module obtains the next data block by continuing to slide the sliding window on the file. If the determined length is greater than or equal to the predetermined maximum length for the variable-size block, the checking unit checks whether there is an alternative end boundary for the variable-size block. Then, the boundary determination unit determines the alternative end boundary as the end boundary of the current variable-size block, if it is checked that there is the alternative end boundary for the variable-size block, and determines the position where the predetermined maximum length ends as the end boundary of the current variable-size block, if it is checked that there is no alternative end boundary for the current variable-size block.

In one embodiment, in deduplication module 802, a calculation unit calculates the hash value of the fixed-size block and the hash value of the variable-size block, respectively, for each of the at least one composite data block partitioned by partitioning module 801. Then, a lookup unit looks up the hash value of the fixed-size block and the hash value of the variable-size block in hash table 803. If the hash value of the fixed-size block is found in hash table 803, a discarding unit discards the corresponding fixed-size block. If the hash value of the fixed-size block is not found in hash table 803, a storage unit stores the corresponding fixed-size block, and stores the hash value of the fixed-size block in hash table 803. If the hash value of the variable-size block is found in hash table 803, the discarding unit discards the corresponding variable-size block. If the hash value of the variable-size block is not found in hash table 803, the storage unit stores the corresponding variable-size block, and stores the hash value of the variable-size block in hash table 803.

It should be noted that the apparatus 800 of the present embodiment can operationally implement the method for deduplication of a file in the embodiments shown in FIG. 2, FIG. 3, FIG. 5, FIG. 6, and FIG. 7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for deduplication of a file, comprising:
   partitioning, by one or more processors, a file into a plurality of composite blocks, wherein each respective composite block consists of:
      a fixed-size block comprising a portion of data of the file, wherein the fixed-size block is of a fixed length; and
      a variable-size block comprising a different portion of data of the file, wherein:
         the variable-size block is of a length determined based on content of the file; and
         the different portion of data of the file is sequentially after the portion of data of the file;
   performing, by one or more processors, a deduplication operation on at least a first composite block of the plurality of composite blocks;
   receiving, by one or more processors, a change to content stored to a first fixed-size block of the first composite block;
   maintaining, by one or more processors, the fixed length of the first fixed-size block subsequent to the change to the content; and
   adjusting, by one or more processors, a first variable-size block of the first composite block based on the change to the content.

2. The method of claim 1, wherein partitioning the file into each respective composite block comprises:
   determining, by one or more processors, a start boundary for the fixed-size block;
   determining, by one or more processors, an end boundary for the fixed-size block, such that the length of the fixed-size block is the first fixed length;
   identifying, by one or more processors, the end boundary for the fixed-size block as a start boundary for the variable-size block; and
   determining, by one or more processors, an end boundary for the variable-size block based on, at least, the content of the file.

3. The method of claim 2, wherein determining the start boundary for the fixed-size block comprises:
   identifying, by one or more processors, a beginning of the file as the start boundary of the fixed-size block.

4. The method of claim 2, wherein determining the start boundary for the fixed-size block comprises:
   identifying, by one or more processors, another composite block in the file; and
   identifying, by one or more processors, an end boundary for a variable-size block of the another composite block as the start boundary for the fixed-size block.

5. The method of claim 2, wherein determining the end boundary for the variable-size block based on, at least, the content of the file comprises:
   moving, by one or more processors, a sliding window of a second fixed length along the file to a position, starting from the end boundary for the fixed-size block;
   obtaining, by one or more processors, a data block within a sliding window;
   calculating, by one or more processors, a hash value of the data block within the sliding window;
   determining, by one or more processors, that the hash value of the data block within the sliding window meets a first predetermined condition; and
   identifying, by one or more processors, the end boundary for the variable-size block based on, at least, the position of the sliding window.

6. The method of claim 5, wherein the first predetermined condition is satisfied if the hash value of the data block modulo a first integer equals a first value, wherein the first value is less than the first integer.

7. The method of claim 2, wherein determining the end boundary for the variable-size block based on, at least the content of the file comprises:
   moving, by one or more processors, a sliding window of a second fixed length along the file to a position, starting from the end boundary for the fixed-size block;
   obtaining, by one or more processors, a data block within the sliding window;
   calculating, by one or more processors, a hash value of the data block within the sliding window;
   determining, by one or more processors, that the hash value of the data block within the sliding window does not meet a first predetermined condition;
   determining, by one or more processors, a length from the start boundary for the variable-size block to the position of the sliding window;

determining, by one or more processors, that the length from the start boundary for the variable-size block to the position of the sliding window is at least equal to a predetermined maximum length; and identifying, by one or more processors, the end boundary for the variable-size block based on, at least, the position of the sliding window.

8. The method of claim 2, wherein determining the end boundary for the variable-size block based on, at least the content of the file comprises:

moving, by one or more processors, a sliding window of a second fixed length along the file to a position, starting from the end boundary for the fixed-size block;

obtaining, by one or more processors, a data block within the sliding window;

calculating, by one or more processors, a hash value of the data block within the sliding window;

determining, by one or more processors, that the hash value of the data block within the sliding window does not meet a first predetermined condition, wherein the first predetermined condition is satisfied if the hash value of the data block modulo a first integer equals a first value, wherein the first value is less than the first integer;

determining, by one or more processors, that the hash value of the data block within the sliding window does meet a second predetermined condition, wherein the second predetermined condition is satisfied if the hash value of the data block modulo a second integer equals a second value, wherein the second integer is less than the first integer, and wherein the second value is less than the second integer; and identifying, by one or more processors, the end boundary for the variable-size block based on, at least, the position of the sliding window.

9. The method of claim 2, further comprising:

moving, by one or more processors, a sliding window of a second fixed length along the file to a first position, starting from the end boundary for the fixed-size block;

obtaining, by one or more processors, a data block within the sliding window;

calculating, by one or more processors, a hash value of the data block within the sliding window;

determining, by one or more processors, that the hash value of the data block within the sliding window does meet a second predetermined condition, wherein the second predetermined condition is satisfied if the hash value of the data block modulo a second integer equals a second value, wherein the second integer is less than a first integer of a first predetermined condition, and wherein the second value is less than the second integer;

determining, by one or more processors, that the first position of the sliding window has not previously been recorded for the variable-size block; and recording, by one or more processors, an alternative end boundary for the variable-size block based on, at least, the first position of the sliding window.

10. The method of claim 9, wherein determining the end boundary for the variable-size block based on, at least the content of the file comprises:

moving, by one or more processors, the sliding window of the second fixed length along the file to a second position;

determining, by one or more processors, a length from the start boundary for the variable-size block to the second position of the sliding window;

determining, by one or more processors, that the length from the start boundary for the variable-size block to the second position of the sliding window is at least equal to a predetermined maximum length; and identifying, by one or more processors, the alternative end boundary for the variable-size block as the end boundary for the variable-size block.

11. The method of claim 1, wherein performing the deduplication operation on at least the first composite block of the plurality of composite blocks comprises:

calculating, by one or more processors, a hash value of the fixed-size block;

determining, by one or more processors, that the hash value of the fixed-size block is found in a hash table;

discarding, by one or more processors, the fixed-size block;

calculating, by one or more processors, a hash value of the variable-size block;

determining, by one or more processors, that the hash value of the variable-size block is found in the hash table; and discarding, by one or more processors, the variable-size block.

12. The method of claim 1, wherein the deduplication operation is a block level deduplication operation.

13. A computer system for deduplication of a file, comprising:

one or more computer processors, one or more computer readable storage media, program instructions stored on the one or more computer readable storage media for execution by at least one of the one or more processors, the program instructions comprising:

program instructions to partition a file into a plurality of composite blocks, wherein each respective composite block consists of:

a fixed-size block comprising a portion of data of the file, wherein the fixed-size block is of a fixed length; and a variable-size block comprising a different portion of data of the file, wherein:

the variable-size block is of a length determined based on content of the file; and the different portion of data of the file is sequentially after the portion of data of the file;

program instructions to perform a deduplication operation on the at least a first composite block of the plurality of composite blocks;

program instructions to receive a change to content stored to a first fixed-size block of the first composite block;

program instructions to maintain the fixed length of the first fixed-size block subsequent to the change to the content; and program instructions to adjust a first variable-size block of the first composite block based on the change to the content.

14. The computer system of claim 13, wherein program instructions to partition the file into each respective composite block comprise:

program instructions to determine a start boundary for the fixed-size block;

program instructions to determine an end boundary for the fixed-size block, such that the length of the fixed-size block is the first fixed length;

program instructions to identify the end boundary for the fixed-size block as a start boundary for the variable-size block; and program instructions to determine an end boundary of the variable-size block based on, at least, the content of the file.

15. The computer system of claim 14, wherein program instructions to determine the start boundary for the fixed-size block comprise:
program instructions to identify another composite block in the file; and
program instructions to determine an end boundary for a variable-size block of the another composite block as the start boundary for the fixed-size block.

16. The computer system of claim 14, wherein program instructions to determine the end boundary of the variable-size block comprise:
program instructions to obtain a data block within a sliding window having a second fixed length, wherein the sliding window is moved along the file to a position, starting from the end boundary for the fixed-size block; and
program instructions to determine that a calculated hash value of the data block within the sliding window meets a first predetermined condition; and
program instructions to identify the end boundary for the variable-size block based on, at least, the position of the sliding window.

17. The computer system of claim 14, wherein program instructions to determine the end boundary for the variable-size block comprise:
program instructions to obtain a data block within a sliding window having a second fixed length, wherein the sliding window is moved along the file to a position, starting from the end boundary for the fixed-size block;
program instructions to determine that a hash value of the data block within the sliding window does not meet a first predetermined condition;
program instructions to determine a length from the start boundary for the variable-size block to the position of the sliding window;
program instructions to determine that the length from the start boundary for the variable-size block to the position of the sliding window is at least equal to a predetermined maximum length; and
program instructions to identify the end boundary for the variable-size block based on, at least, the position of the sliding window.

18. The computer system of claim 14, wherein program instructions to determine the end boundary for the variable-size block comprise:
program instructions to obtain a data block within a sliding window having a second fixed length, wherein the sliding window is moved along the file to a position, starting from the end boundary for the fixed-size block;
program instructions to determine that a calculated hash value of the data block within the sliding window does not meets a first predetermined condition, wherein the first predetermined condition is satisfied if the hash value of the data block modulo a first integer equals a first value, wherein the first value is less than the first integer;
program instructions to determine that the calculated hash value of the data block within the sliding window does meet a second predetermined condition, wherein the second predetermined condition is satisfied if the hash value of the data block modulo a second integer equals a second value, wherein the second integer is less than the first integer, and wherein the second value is less than the second integer; and
program instructions to identify the end boundary for the variable-size block based on, at least, the position of the sliding window.

19. The computer system of claim 14, further comprising:
program instructions to obtain a data block within a sliding window having a second fixed length, wherein the sliding window is moved along the file to a first position, starting from the end boundary for the fixed-size block;
program instructions to determine that a hash value of the data block within the sliding window does meet a second predetermined condition, wherein the second predetermined condition is satisfied if the hash value of the data block modulo a second integer equals a second value, wherein the second integer is less than a first integer of a first predetermined condition, and wherein the second value is less than the second integer;
program instructions to determine that the first position of the sliding window has not previously been recorded for the variable-size block; and
program instructions to record an alternative end boundary for the variable-size block based on, at least, the first position of the sliding window.

20. A computer program product for deduplication of a file, comprising:
one or more computer readable storage media and program instructions stored on the one or more computer readable storage media, the program instructions comprising:
program instructions to partition a file into a plurality of composite blocks, wherein each respective composite block consists of:
a fixed-size block comprising a portion of data of the file, wherein the fixed-size block is of a fixed length; and
a variable-size block comprising a different portion of data of the file, wherein:
the variable-size block is of a length determined based on content of the file; and
the different portion of data of the file is sequentially after the portion of data of the file;
program instructions to perform a deduplication operation on at least a first composite block of the plurality of composite blocks;
program instructions to receive a change to content stored to a first fixed-size block of the first composite block;
program instructions to maintain the fixed length of the first fixed-size block subsequent to the change to the content; and
program instructions to adjust a first variable-size block of the first composite block based on the change to the content.

* * * * *